US008503010B2

(12) United States Patent
Satake

(10) Patent No.: US 8,503,010 B2
(45) Date of Patent: Aug. 6, 2013

(54) DISPLAY CONTROL DEVICE, DISPLAY CONTROL METHOD, IMAGE-FORMING DEVICE, COMPUTER READABLE MEDIUM, AND COMPUTER DATA SIGNAL

(75) Inventor: Masanori Satake, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1086 days.

(21) Appl. No.: 12/425,192

(22) Filed: Apr. 16, 2009

(65) Prior Publication Data

US 2010/0110480 A1 May 6, 2010

(30) Foreign Application Priority Data

Oct. 30, 2008 (JP) ................................. 2008-280379

(51) Int. Cl.
*G06F 3/12* (2006.01)
(52) U.S. Cl.
USPC ............................ 358/1.15; 358/1.1; 345/619
(58) Field of Classification Search
USPC .................................. 358/1.1, 1.15; 345/619
See application file for complete search history.

(56) References Cited

U.S. PATENT DOCUMENTS

| 2001/0006375 A1 | 7/2001 | Tomooka et al. | |
|---|---|---|---|
| 2003/0122879 A1* | 7/2003 | Inui et al. | 345/853 |
| 2005/0166240 A1 | 7/2005 | Kim | |
| 2006/0190838 A1 | 8/2006 | Nadamoto | |
| 2008/0020804 A1 | 1/2008 | Kuwabara et al. | |
| 2008/0168372 A1 | 7/2008 | Inui et al. | |

FOREIGN PATENT DOCUMENTS

| CN | 1771475 | | 5/2006 |
|---|---|---|---|
| CN | 101116314 | A | 1/2008 |
| JP | 05-282119 | A | 10/1993 |
| JP | 06-237301 | A | 8/1994 |
| JP | 07-281859 | A | 10/1995 |
| JP | 07-334340 | A | 12/1995 |
| JP | 09-330198 | A | 12/1997 |
| JP | 10-124284 | A | 5/1998 |
| JP | 10-171624 | A | 6/1998 |
| JP | 10-232755 | A | 9/1998 |
| JP | 11-327731 | A | 11/1999 |
| JP | 2001-243490 | A | 9/2001 |
| JP | 2003-195994 | A | 7/2003 |
| JP | 2004-310655 | A | 11/2004 |

(Continued)

OTHER PUBLICATIONS

Office Action dated Aug. 16, 2012 from the People Republic of China in a counterpart Chinese Application No. 200910141285.X.

*Primary Examiner* — King Poon
*Assistant Examiner* — Iriana Cruz
(74) *Attorney, Agent, or Firm* — Sughrue Mion, PLLC

(57) ABSTRACT

A display control device includes: a request receiving unit that receives a request to display a first image, in which a stack order of images in a visual direction of a user is specified; an obtaining unit that obtains a display priority of an image group to which the first image belongs; a display layer identifying unit that identifies a display layer from among plural display layers divided from a near side to a far side in the visual direction, a position of the display layer becoming nearer in the visual direction as the obtained display priority increases; and a display control unit that causes a display unit to display a screen in which the first image and a second image belonging to an image group identical to the image group to which the first image belongs are arranged in the identified display layer in the specified stack order.

8 Claims, 7 Drawing Sheets

FOREIGN PATENT DOCUMENTS

| | | |
|---|---|---|
| JP | 2004-326742 A | 11/2004 |
| JP | 2007-121798 A | 5/2007 |
| JP | 2007-249370 A | 9/2007 |
| KR | 10-2005-0071765 | 7/2005 |

* cited by examiner

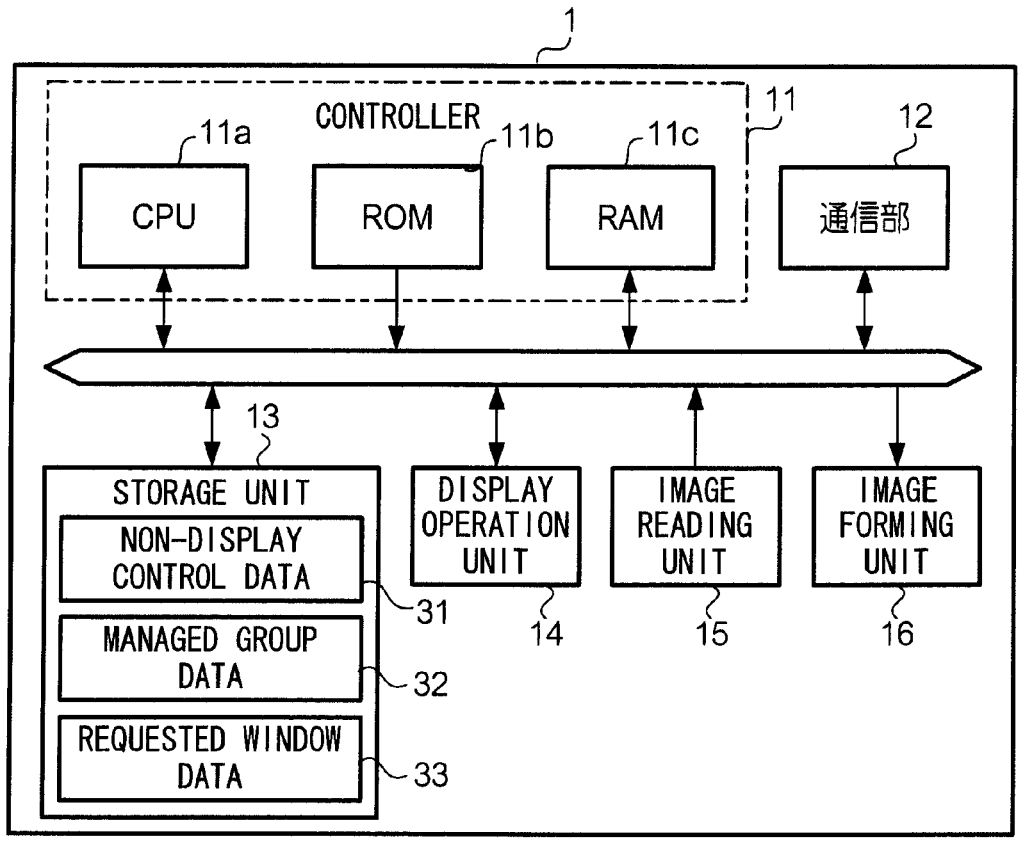

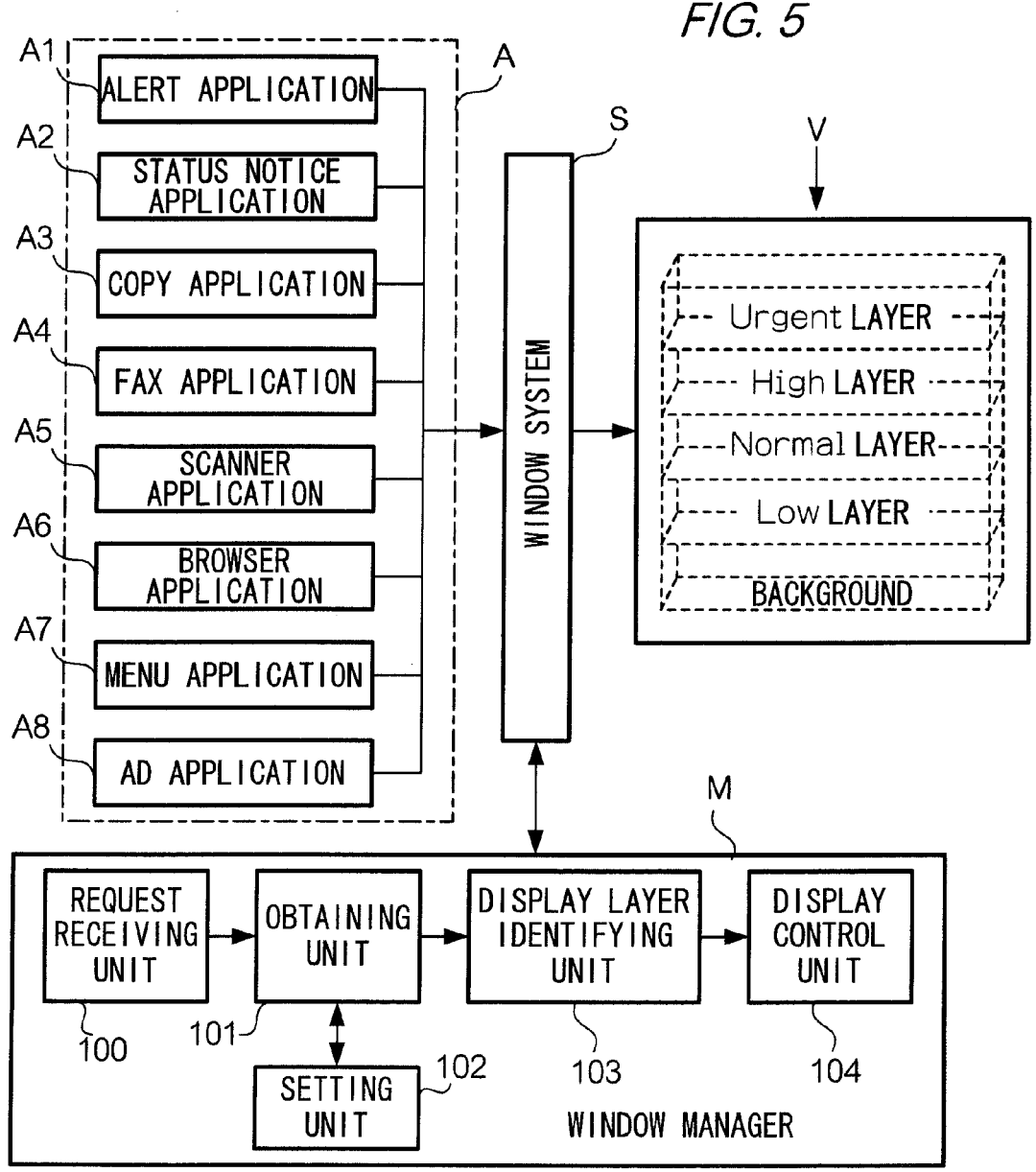

| APPLICATION | GROUP ID | DISPLAY PRIORITY |
|---|---|---|
| ALERT APPLICATION | GroupA | Urgent |
| STATUS NOTICE APPLICATION | GroupB | High |
| COPY APPLICATION | GroupC | Normal |
| FAX APPLICATION | GroupD | Normal |
| SCANNER APPLICATION | GroupE | Normal |
| MENU APPLICATION | GroupF | Low |
| AD APPLICATION | GroupG | Urgent |

DISPLAY CONTROL DEVICE, DISPLAY CONTROL METHOD, IMAGE-FORMING DEVICE, COMPUTER READABLE MEDIUM, AND COMPUTER DATA SIGNAL

CROSS-REFERENCE TO RELATED APPLICATIONS

This application is based on and claims priority under 35 USC 119 from Japanese Patent Application No. 2008-280379 filed on Oct. 30, 2008.

BACKGROUND

1. Technical Field

The present invention relates to a display control device, a display control method, an image-forming device, a computer readable medium, and a computer data signal.

2. Related Art

A technique for displaying plural windows on a screen in a layered manner is known.

SUMMARY

An aspect of the present invention provides a display control device including: a request receiving unit that receives a request to display a first image, in which a stack order of images in a visual direction of a user is specified; an obtaining unit that obtains data on a display priority of an image group to which the first image belongs; a display layer identifying unit that identifies a display layer from among plural display layers divided from a near side to a far side in the visual direction, a position of the display layer becoming nearer in the visual direction as the display priority indicated by the obtained data increases; and a display control unit that causes a display unit to display a screen in which the first image and a second image belonging to an image group identical to the image group to which the first image belongs, the second image being a currently displayed image, are arranged in the identified display layer, the first image and the second image being arranged from the near side to the far side in the visual direction in the specified stack order.

BRIEF DESCRIPTION OF THE DRAWINGS

Exemplary embodiments of the present invention will be described in detail below with reference to the following figures, wherein:

FIG. 1 is a block diagram illustrating a configuration of an image-forming device according to an exemplary embodiment;

FIG. 2 is a diagram illustrating an example of non-display control data stored in the image-forming device;

FIG. 3 is a diagram illustrating an example of managed group data stored in the image-forming device;

FIG. 4 is a diagram illustrating an example of requested window data stored in the image-forming device;

FIG. 5 is a diagram illustrating a function configuration of the image-forming device;

DETAILED DESCRIPTION

[Configuration]

Figures 6, 7:
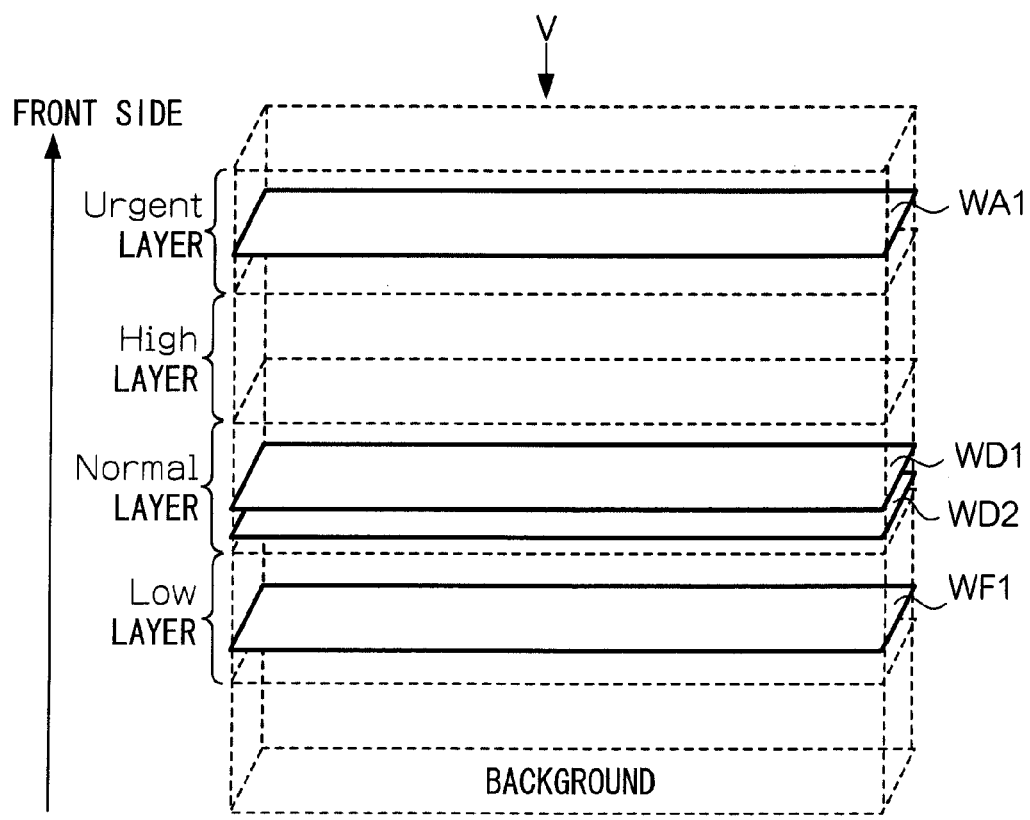
FIG. 6 is a diagram illustrating an example of designation of a display priority and a group ID.
FIG. 7 is a diagram schematically illustrating screens displayed on the image-forming device.

FIG. 1 is a block diagram illustrating a configuration of image-forming device 1 according to an exemplary embodiment. In the present exemplary embodiment, as a display control device, image-forming device 1 having a printer function, a scanner function, and a copy function is used. As shown in the drawing, image-forming device 1 includes controller 11, communication unit 12, storage unit 13, display operation unit 14, image-reading unit 15, and image-forming unit 16. Controller 11 includes CPU (Central Processing Unit) 11a, ROM (Read Only Memory) 11b, and RAM (Random Access Memory) 11c. In the present exemplary embodiment, as a request receiving unit, an obtaining unit, a display layer identifying unit, a display control unit, and a setting unit, CPU 11a is used; as a display unit, display operation unit 14 is used; and as an image-forming unit, image-forming unit 16 is used.

CPU 11a executes a program stored in ROM 11b or storage unit 13 to control components of image-forming device 1. ROM 11b stores programs and data necessary for starting image-forming device 1. RAM 11c is used as a work area when a program is executed by CPU 11a. Communication unit 12 establishes communication with an external device (not shown) via a communication line to exchange data. Storage unit 13 is, for example, a hard disk, which stores different programs to be executed by CPU 11a, and also stores non-display control data 31, managed group data 32, and requested window data 33. Display operation unit 14 is, for example, a touch screen, which displays a screen under control of CPU 11a, and also inputs an operation signal corresponding to an operation of a user, to CPU 11a. On a screen displayed by display operation unit 14, plural windows can be arranged. A window is an image displayed by application A (described later). Image-reading unit 15 is, for example, a scanner, which reads an image of a document and outputs image data representing the read image. Image-forming unit 16 is, for example, a printer that forms an image in an electrophotographic manner, which forms an image according to image data output from image-reading unit 15 or image data received by communication unit 12 on a sheet, and outputs it.

Now, non-display control data 31 stored in storage unit 13 will be described. FIG. 2 is a diagram illustrating an example of non-display control data 31. As shown in the drawing, non-display control data 31 includes data indicating a display priority and data indicating whether a non-display control is necessary, the pieces of data being associated with each other. A display priority is a priority assigned to display of a window group to which a window displayed on display operation unit 14 belongs. Each window is displayed in a display layer corresponding to a display priority assigned to a window group to which the window belongs. A term "URGENT" shown in FIG. 2 indicates that a priority of display is highest, a term "HIGH" indicates that a priority of display is second highest, a term "NORMAL" indicates that a priority of display is third highest, and a term "LOW" indicates that a priority of display is lowest. For example, in non-display control data 31 shown in FIG. 2, data of a display priority "URGENT" and data indicating that a non-display control is "UNNECESSARY" are associated. This means that a non-display control is not performed in a display layer corresponding to a display priority "URGENT". In non-display control data 31 shown in FIG. 2, also, data indicating display priorities "HIGH" and "NORMAL" are associated with data indicating that an non-display control is "NECESSARY". This means that a non-display control is performed in display layers corresponding to display priorities "HIGH" and "NORMAL". In non-display control data 31 shown in FIG. 2, also, data indicating a display priority "LOW" and data indicating a sign "–" are associated. This means that in a display layer corresponding to a display priority "LOW", it is not possible to display multiple window groups in a layered manner.

Now, managed group data 32 stored in storage unit 13 will be described. Managed group data 32 is related to data on window groups managed by window manager M (described later). FIG. 3 is a diagram illustrating an example of managed group data 32. As shown in the drawing, managed group data 32 includes a group ID, data indicating a display priority, and a group display status, the pieces of data being associated with each other. A group ID is data for identifying a window group. A display priority is the same as that of non-display control data 31. A group display status is data indicating whether a window group is being displayed. Managed group data 32 is updated each time a display status of a window group is switched between a non-display status and an on-display status.

Now, requested window data 33 stored in storage unit 13 will be described. Requested window data 33 is related to data on a window whose display or non-display has been requested by application A (described later). FIG. 4 is a diagram illustrating an example of requested window data 33. As shown in the drawing, requested window data 33 includes a window ID, a group ID, and a requested window status, the pieces of data being associated with each other. A window ID is data for identifying a window. A group ID is the same data as that of managed group data 32. A requested window status is data indicating whether a window is being displayed. Requested window data 33 is updated each time a display status of a window is switched between a non-display status and an on-display status.

Now, functions of image-forming device 1 will be described. In image-forming device 1, different functions are realized through execution of different programs by CPU 11a. Here, only functions characteristic of the present invention, among the functions of image-forming device 1, will be described. FIG. 5 is a diagram illustrating a function configuration of image-forming device 1. As shown in the drawing, image-forming device 1 has functions of applications A, window system S, and window manager M. Applications A include alert application A1, status notice application A2, copy application A3, fax application A4, scanner application A5, browser application A6, menu application A7, and ad application A8. Application A1 provides a function of notifying a user of a malfunction of image-forming device 1 or exhaustion of supplies. Status notice application A2 provides a function of notifying a user of progress of a service such as copy, fax, or scan. Copy application A3, fax application A4, and scanner application A5 provide a copy function, a fax function, and a scanner function, respectively. Browser application A6 is an application created by a third party who is not a manufacturer of image-forming device 1, which provides a function of displaying a Web page. Menu application A7 provides a function of receiving selection of a service such as copy, fax, or scan. Ad application A8 provides a function of displaying a predetermined ad.

Each application A makes a request for window system S to display or hide windows by specifying a stack order of the windows. Each application A, when requesting display of a window, specifies a display priority and a window group ID. FIG. 6 is a diagram illustrating an example of display priorities and group IDs specified by applications A. As shown in the drawing, each application A specifies a different group ID and a display priority predetermined for each application A. For example, alert application A1 specifies "GROUP A" as a group ID, and specifies "URGENT" as a display priority. The reason that alert application A1 specifies the highest display priority "URGENT" is that the priority of contents of windows displayed by alert application A1 is high. Copy application A3, fax application A4, and scanner application A5 specify the same display priority "NORMAL". Browser application A6 does not specify a display priority or a window ID, because the application is an application created by a third party who is not a manufacturer of image-forming device 1.

In FIG. 5, window system S is, for example, an X Window System, which displays or hides a window in response to a request from application A to display or hide a window, under control of window manager M. When displaying a window, window system S displays it in a display layer corresponding to a display priority specified by application A. FIG. 5 schematically shows display layers of a screen displayed on display operation unit 14. As shown in the drawing, the screen is logically divided into four display layers of an urgent layer, a high layer, a normal layer, and a low layer, which are arranged from a near side to a far side in the visual direction (the direction indicated by arrow V in the drawing) of a user. If a window is arranged in a near-side display layer, a window arranged in a far-side display layer is invisible to a user.

Window manager M manages windows, displaying or hiding of which has been requested by application A, using managed group data 32 and requested window data 33 stored in storage unit 13. Window manager M also controls displaying and hiding of a window. As shown in FIG. 5, window manager M has functions of request receiving unit 100, obtaining unit 101, setting unit 102, display layer identifying unit 103, and display control unit 104. Request receiving unit 100 receives a request to display a window, in which a stack order of the window in the visual direction of a user is specified. Obtaining unit 101 obtains, in response to a receipt of a display request by request receiving unit 100, data on a display priority of a window group including a window the displaying of which has been requested. Setting unit 102, if obtaining unit 101 does not obtain data on a display priority of a window group including a window the displaying of which has been requested, sets a display priority for the window group. A case that data on a display priority is not obtained is, for example, a case that a display priority is not specified by application A. Display layer identifying unit 103 identifies a display layer from among a plurality of display layers divided from a near side to a far side in the visual direction of a user, a position of the display layer becoming nearer in the visual direction as a display priority indicated by data obtained by obtaining unit 101 increases. Display control unit 104 causes display operation unit 14 to display a screen in which a first window the displaying of which has been requested and a second window belonging to an image group identical to a window group to which the first window belongs, the second window being a currently displayed window, are arranged in a display layer identified by display layer identifying unit

103. The first window and the second window are arranged from a near side to a far side in a visual direction of a user in a specified stack order.

[Operation]

An operation of image-forming device 1 will be described. Here, display control of a window characteristic of the present invention, among operations of image-forming device 1, will be described. Assumptions of the operation will first be described. In the following explanation, it is assumed that on display operation unit 14 of image-forming device 1, a screen is displayed as shown in FIG. 7. Similarly to FIG. 5, FIG. 7 schematically shows a screen displayed on display operation unit 14. As shown in FIG. 7, on the screen, window WA1 having a window ID "A1" is arranged in an urgent layer, window WD1 having a window ID "D1" and window WD2 having a window ID "D2" are arranged in a normal layer, and window WF1 having a window ID "F1" is arranged in a low layer. Also, it is assumed that storage unit 13 stores non-display control data 31 shown in FIG. 2, managed group data 32 shown in FIG. 3, and requested window data 33 shown in FIG. 4. Also, it is assumed that displaying of window WC3 having a window ID "C3" is requested by copy application A3.

When the request is made, CPU 11a specifies a display priority and a group ID, as described above, using copy application A3. In this example, a display priority "NORMAL" is specified, and a group ID "GROUP C" is specified, as shown in FIG. 6. Subsequently, CPU 11a makes a request for window system S to display window WC3 having a window ID "C3", using copy application A3. Subsequently, CPU 11a provides the request to display window WC3, data on the display priority "NORMAL" specified by copy application A3, and data on the group ID "GROUP C" specified by the same application to window manager M, using window system S.

Figure 8:
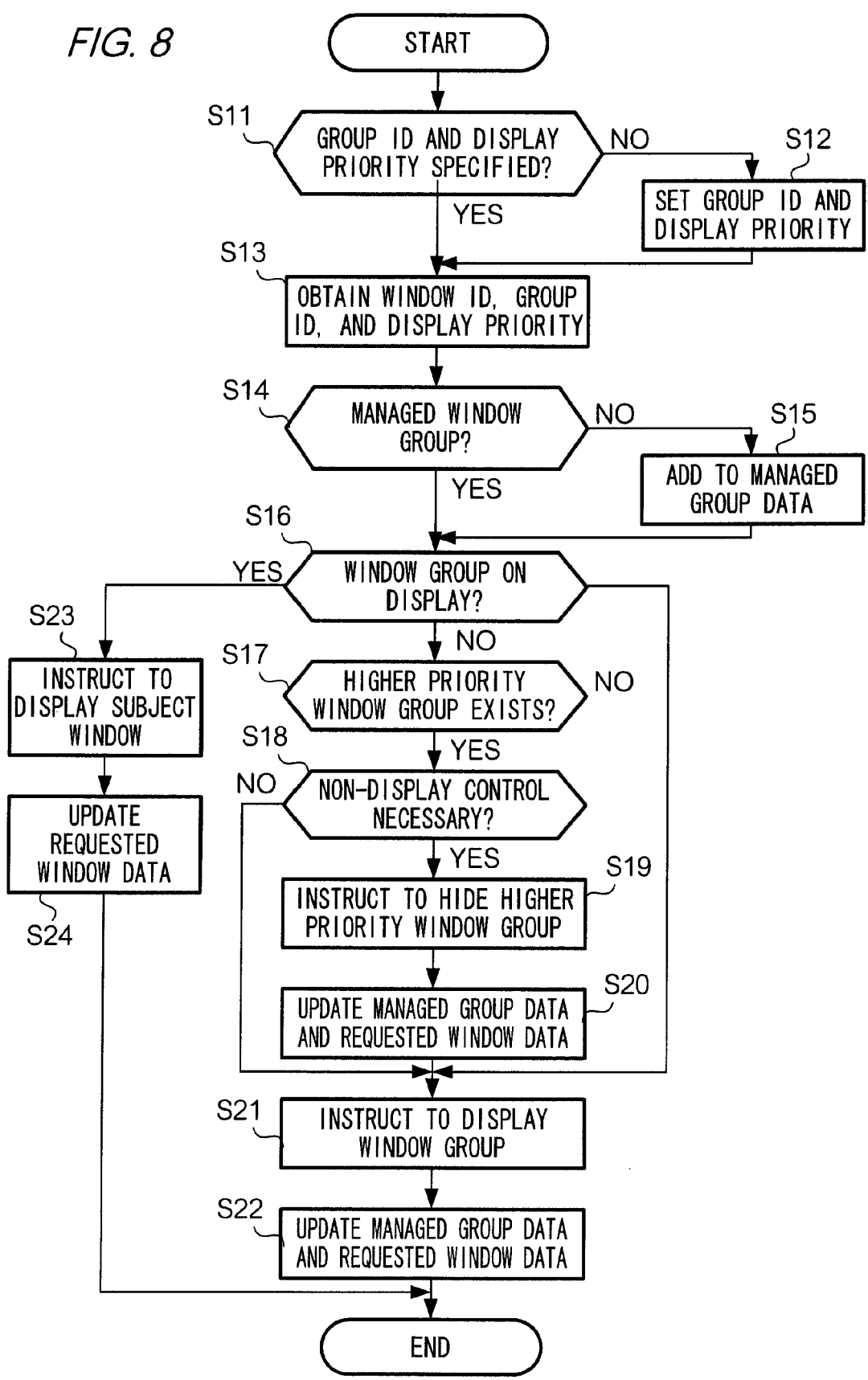
FIG. 8 is a flowchart illustrating an operation executed by a window manager of the image-forming device.

FIG. 8 is a flowchart illustrating an operation of window manager M, which is carried out when window manager M receives a request to display a window. CPU 11a carries out the operation, using window manager M. At the first step of the operation, CPU 11a determines with regard to a window the displaying of which has been requested (hereinafter referred to as "subject window") whether a group ID and a display priority have been specified (step S11). If the application that has requested display of a window is browser application A6, since a display priority and a group ID are not specified, a display priority and a group ID are not provided to window manager M. In this case, CPU 11a determines that a group ID and a display priority have not been specified (step S11: NO), sets a group ID to "GROUP X" and a display priority to "NORMAL" (step S12), and proceeds to step S13. Namely, if no data is obtained with regard to a display priority of a window group including a window, displaying of which has been requested, CPU 11a assigns a display priority to the window group. Accordingly, even if display of a window is requested by application A such as browser application A6 that does not specify a group ID and a display priority, a display control of a window is performed as in the case where display of a window is requested by application A specifying a group ID and a display priority. Also, since the setting of a group ID and a display priority is performed by window manager M, it is not necessary to modify application A. In this example, since a display priority "NORMAL" and a group ID "GROUP C" are specified by copy application A3 as described above, data on the display priority and the group ID is provided to window manager M. Accordingly, CPU 11a determines that a group ID and a display priority have been specified (step Sit: YES), and proceeds to step S13.

Subsequently, CPU 11a obtains data on a window ID, a group ID and a display priority of the subject window (step S13). Data on a window ID is obtained from attribute data of the subject window. Data on a group ID and a display priority is the data provided to window manager M or the data set at step S12. In this example, data on a window ID "C3" included in attribute data of window WC3, the display priority "NORMAL" provided to window manager M, and the group ID "GROUP C" provided to window manager M is obtained. Subsequently, CPU 11a determines on the basis of managed group data 32 stored in storage unit 13 whether a window group to which the subject window belongs is a managed window group (step S14). In this example, since the group ID "GROUP C" is included in managed group data 32 as shown in FIG. 3, CPU 11a determines that the window group to which the subject window belongs is a managed window group (step S14: YES), and proceeds to step S16.

Subsequently, CPU 11a determines on the basis of managed group data 32 stored in storage unit 13 whether the window group to which the subject window belongs is being displayed (step S16). In this example, since the group ID "GROUP C" is associated with a group display status "NON-DISPLAY" in managed group data 32 as shown in FIG. 3, it is determined that the window group to which the subject window belongs is not being displayed (step S16: NO). In this case, CPU 11a determines on the basis of managed group data 32 stored in storage unit 13 whether there is a window group having a display priority identical to that of the subject window, that is being displayed (hereinafter referred to as "preceding window") (step S17). In this example, since a display priority associated with a group ID "GROUP D" is "NORMAL", and a group display status associated with the same group ID is "ON DISPLAY" in managed group data 32 as shown in FIG. 3, CPU 11a determines that a preceding window group exists (step S17: YES). In this case, CPU 11a determines on the basis of non-display control data 31 stored in storage unit 13 whether it is necessary to perform a non-display control (step S18). In this example, since a display priority "NORMAL" is associated with data indicating that a non-display control is "NECESSARY" in non-display control data 31 as shown in FIG. 2, CPU 11a determines that a non-display control is necessary (step S18: YES).

If it is determined that a non-display control is necessary, CPU 11a instructs window system S to hide the preceding window group (step S19). Specifically, CPU 11a identifies a window ID associated with the group ID of the preceding window group on the basis of requested window data 33 stored in storage unit 13. In this example, since the group ID of the preceding window group is "GROUP D", window IDs "D1" and "D2" associated with the group ID "GROUP D" are identified on the basis of requested window data 33 shown in FIG. 4. Subsequently, CPU 11a instructs window system S to hide window WD1 having the identified window ID "D1" and window WD2 having the similarly identified window ID "D2". Subsequently, CPU 11a updates managed group data 32 and requested window data 33 stored in storage unit 13, on the basis of the instruction to window system S (step S20). Specifically, CPU 11a changes a group display status associated with the group ID "GROUP D" to "NON-DISPLAY" in managed group data 32 shown in FIG. 3. CPU 11a also a changes a requested window status associated with the window ID "D1" or "D2" to "NON-DISPLAY" in requested window data 33 shown in FIG. 4.

Subsequently, CPU 11a identifies a display layer corresponding to the display priority obtained at step S13, and instructs window system S to display the window group to which the subject window belongs in the identified display layer (step S21). The position of the identified display layer becomes nearer in the visual direction as the display priority obtained at step S13 increases. Specifically, CPU 11a identifies a window ID associated with the group ID obtained at step S13 in requested window data 33 stored in storage unit 13. In this example, window IDs "C1" and "C2" associated with the group ID "GROUP C" are identified in requested window data 33 shown in FIG. 4. Subsequently, CPU 11a instructs window system S to display window WC3 having the window ID "C3", which is the subject window, window WC1 having the identified window ID "C1", and window WC2 having the similarly identified window ID "C2", in a normal layer corresponding to the display priority "NORMAL". Subsequently, CPU 11a updates managed group data 32 and requested window data 33 stored in storage unit 13, on the basis of the instruction to window system S (step S22). Specifically, CPU 11a changes a group display status associated with the group ID "GROUP C" to "ON DISPLAY" in managed group data 32 shown in FIG. 3. CPU 11a also adds a record having a window ID "C3" and a group ID "GROUP C" to requested window data 33 shown in FIG. 4, and changes a requested window status associated with the window ID "C1", "C2", or "C3" to "ON DISPLAY".

After the instruction to hide windows WD1 and WD2 and the instruction to display windows WC1, WC2, and WC3 in a normal layer are given as described above, CPU 11a carries out the following operation, using window system S. CPU 11a, if a window belonging to a window group to which the subject window does not belong is arranged in a display layer in which the subject window is to be arranged, causes display operation unit 14 to hide the window. In this example, CPU 11a causes display operation unit 14 to hide windows WD1 and WD2 displayed in a normal layer. Subsequently, CPU 11a, if there is a window belonging to a window group identical to that of the subject window, hiding of which has been requested, causes display operation unit 14 to display a screen in which the subject window and the window are arranged in a display layer corresponding to a display priority of the subject window and in a specified stack order. In this example, CPU 11a causes display operation unit 14 to display a screen in which windows WC1, WC2, and WC3 are arranged in a normal layer and in a stack order specified by copy application A3. Window WC3 is a window, displaying of which has been requested by copy application A3. Windows WC1 and WC2 are windows belonging to a window group identical to that of window WC3, hiding of which has been requested by copy application A3.

Figure 9:
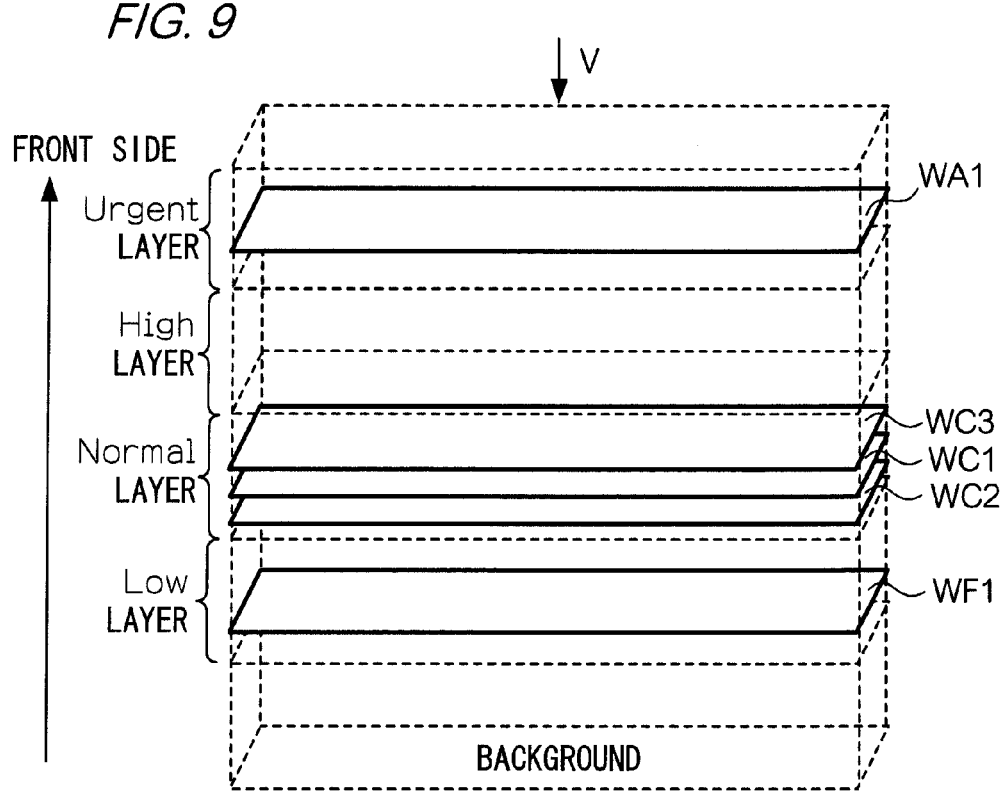
FIG. 9 is a diagram schematically illustrating screens displayed on the image-forming device.

FIG. 9 is a diagram schematically illustrating the screen displayed on display operation unit 14. As shown in the drawing, in a normal layer of the screen, windows WC3, WC1, and WC2 are arranged, instead of windows WD1 and WD2 arranged in FIG. 7. However, since window WA1 is arranged in an urgent layer that is a display layer anterior to a normal layer in the visual direction (the direction of arrow V in the drawing), window WA1 is seen at the forefront of the screen by a user. This is because the display priority of windows WC1 to WC3 is normal, which is a lower priority than that of window WA1. Accordingly, it never occurs that display of a window having a high display priority is hindered by that of a window having a low display priority. Also, as shown in the drawing, windows WC1 to WC3 are arranged in a stack order specified by copy application A3, as described above. Accordingly, if window WA1 displayed in an urgent layer is hidden, window WC3 which is a window arranged at the forefront of a normal layer in the visual direction (the direction of arrow V) is displayed at the forefront of the screen according to an instruction from copy application A3.

Now, operations of cases in which display of a window is different from that of the above case will be described with some examples. For example, it is assumed that display of window WA2 having a window ID "A2" is requested by alert application A1. In this case, alert application A1 specifies "GROUP A" as a group ID, and "URGENT" as a display priority, as shown in FIG. 6. Accordingly, at step S11 described above, it is determined that a group ID and a display priority have been specified (step Sit: YES), and at step S13, data on the window ID "A2", the group ID "GROUP A", and the display priority "URGENT" is obtained. At step S14, since the group ID "GROUP A" is included in managed group data 32 shown in FIG. 3, it is determined that a window group to which window WA2 belongs is a managed window group (step S14: YES). At step S16, since the group ID "GROUP A" is associated with a group display status "ON DISPLAY" in managed group data 32 shown in FIG. 3, it is determined that the window group to which window WA2 belongs is being displayed (step S16: YES).

If the window group to which the subject window belongs is being displayed, CPU 11a instructs window system S to display the subject window in a display layer corresponding to the display priority obtained at step S13 (step S23). In the example, an instruction is given to display window WA2 having the window ID "A2" in an urgent layer corresponding to the display priority "URGENT". Subsequently, CPU 11a updates requested window data 33 stored in storage unit 13, on the basis of the instruction to window system S (step S24). In the example, since a record having the window ID "A2" is not included in requested window data 33 shown in FIG. 4, a record having the window ID "A2" and the group ID "GROUP A" is added, and a requested window status of the record is set to "ON DISPLAY".

Figure 10:
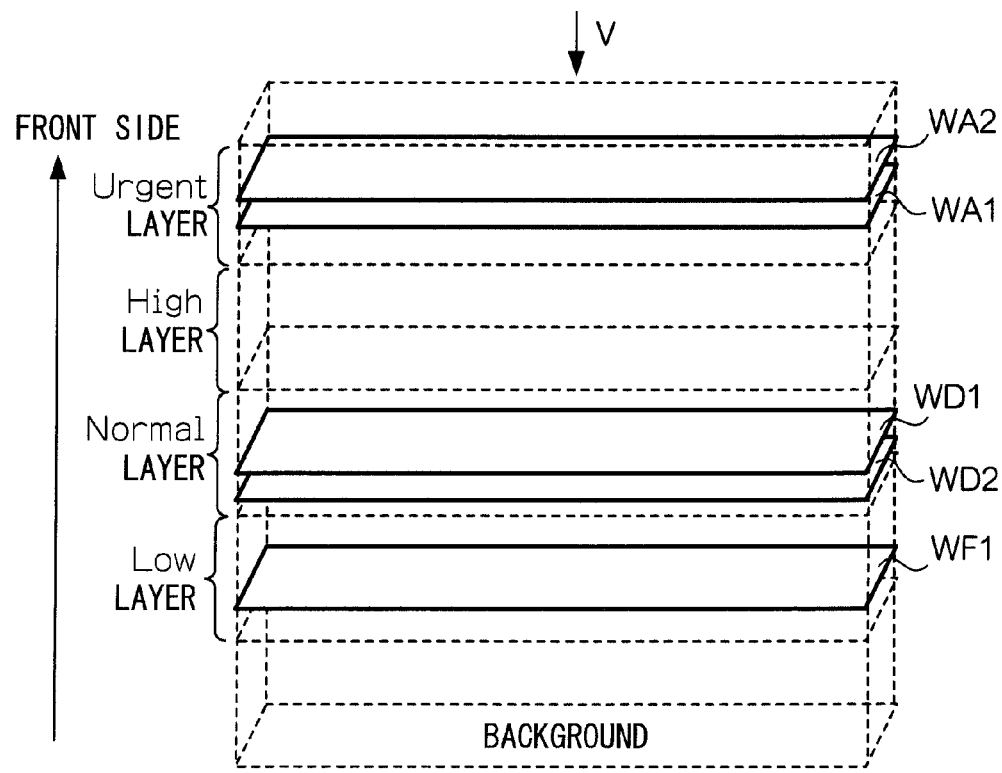
FIG. 10 is a diagram schematically illustrating screens displayed on the image-forming device.

After the instruction to display window WA2 in an urgent layer is given to window system S, CPU 11a causes display operation unit 14 to display window WA2 in an urgent layer, using window system S. In this case, window WA2, which is the subject window, and window WA1, which is being displayed, are arranged in a stack order specified by alert application A1. FIG. 10 is a diagram schematically illustrating the screen displayed on display operation unit 14. As shown in the drawing, in the urgent layer of the screen, window WA2 is arranged before window WA1 arranged in FIG. 7, in the visual direction (the direction of arrow V in the drawing). Accordingly, window WA2 is seen at the forefront of the screen by a user. When the screen is displayed, a user may operate display operation unit 14 by selecting a soft button provided at window WA2, thereby replacing window WA2 with window WA1 to make window WA1 appear at the forefront of the screen.

Now, it is assumed that display of window WG1 having a window ID "G1" is requested by ad application A8. In this case, ad application A8 specifies "GROUP G" as a group ID and "URGENT" as a display priority, as shown in FIG. 6. Accordingly, at step S11 described above, it is determined that a group ID and a display priority have been specified (step S11: YES), and at step S13, data on the window ID "G1", the group ID "GROUP G", and the display priority "URGENT" is obtained. At step S14, since the group ID "GROUP G" is not included in managed group data 32 shown in FIG. 3, it is determined that a window group to which window WG1 belongs is not a managed window group (step S14: NO). In this case, CPU 11a adds a record having the group ID and the display priority obtained at step S13 to managed group data 32 stored in storage unit 13, and sets a group display status of the record to "NON-DISPLAY" (step S15). In this example, a record having the group ID "GROUP G" and the display priority "URGENT" is added to managed group data 32 shown in FIG. 3, and a group display status of the record is set to "NON-DISPLAY". Subsequently, CPU 11*a* proceeds to step S16 described above. At step S16, since the group ID "GROUP G" is associated with a group display status "NON-DISPLAY" in managed group data 32, it is determined that the window group to which window WG1 belongs is not being displayed (step S16: NO). At step S17, since a display priority associated with a group ID "GROUP A" is "URGENT", and a group display status associated with the same group ID is "ON DISPLAY" in managed group data 32 as shown in FIG. 3, it is determined that a preceding window group exists (step S17: YES). At step S18, since the display priority "URGENT" is associated with data indicating that an non-display control is "UNNECESSARY" in non-display control data 31 as shown in FIG. 2, it is determined that a non-display control is not necessary (step S18: NO).

If it is determined that a non-display control is not necessary, CPU 11*a* proceeds to step S21, without performing steps S19 and S20 described above. At step S21, since no window ID is associated with the group ID "GROUP G" in requested window data 33 shown in FIG. 4, CPU 11*a* instructs window system S to display window WG1 having the window ID "G1", which is the subject window, in an urgent layer corresponding to the display priority "URGENT". At step S22, a group display status associated with the group ID "GROUP G" is changed to "ON DISPLAY" in managed group data 32. Also, a record having the window ID "G1" and the group ID "GROUP G" is added to requested window data 33 shown in FIG. 4, and a requested window status of the record is set to "ON DISPLAY".

Figure 11:
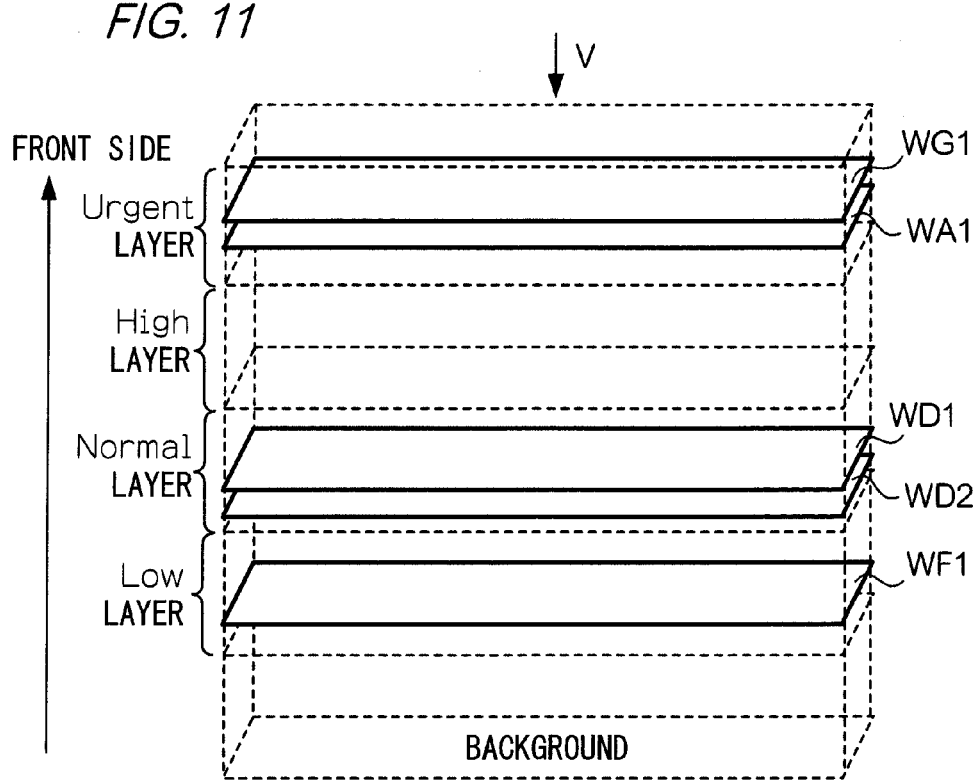
FIG. 11 is a diagram schematically illustrating screens displayed on the image-forming device.

After the instruction to display window WG1 in an urgent layer is given, CPU 11*a* causes display operation unit 14 to display window WG1 in an urgent layer, using window system S. CPU 11*a*, if a window belonging to a window group to which the subject window does not belong is arranged in a display layer in which the subject window is to be arranged, causes display operation unit 14 to display a screen in which the subject window is arranged before the window in the visual direction. In this example, window WG1 is arranged before window WA1 arranged in an urgent layer. FIG. 11 is a diagram schematically illustrating the screen displayed on display operation unit 14. As shown in the drawing, in the urgent layer of the screen, window WG1 is arranged before window WA1 arranged in FIG. 7, in the visual direction (the direction of arrow V in the drawing). Accordingly, window WG1 is seen at the forefront of the screen by a user. Namely, in a display layer in which a non-display control is not performed, windows belonging to different window groups are arranged in a layered manner. When the screen is displayed, a user may operate display operation unit 14 to press a soft button provided at window WG1, thereby replacing window WG1 with window WA1 to make window WA1 appear at the forefront of the screen.

To summarize the foregoing description, CPU 11*a* of image-forming device 1 receives a request to display an image from a source of request such as application A. CPU 11*a* also assigns from among plural display layers divided from a near side to a far side in the visual direction of a user, a display layer to the source of request. If a request to display an image is received from plural sources of request, CPU 11*a* carries out an operation to make invisible some of the images the displaying of which has been requested by sources of request other than a source of request to which a display layer positioned at the nearest side in the visual direction is assigned from among the plural sources of request. CPU 11*a* also carries out an operation to make visible or invisible an image the displaying of which has been requested by the source of request to which a display layer positioned at the nearest side in the visual direction is assigned among the plural source of request, in accordance with an instruction from the source of request. The operation for making an image visible includes an operation of displaying only an image to be visualized, and hiding other images, and an operation of arranging an image to be visualized as nearest in the visual direction. On the other hand, the operation for making an image invisible includes (1) an operation of hiding an image to be made invisible, (2) an operation of arranging an image before an image to be made invisible in the visual direction, and (3) a combination of the former two operations. In the second or third operation, an image to be made invisible may be completely covered by another image, or partially covered by another image.

Figure 12:
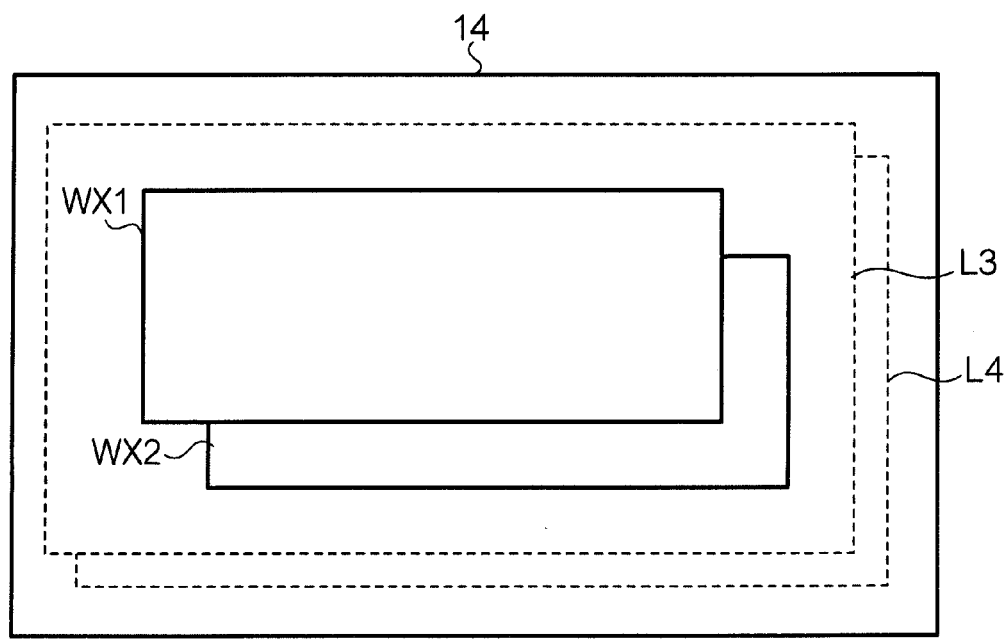
FIG. 12 is a diagram illustrating screens displayed on the image-forming device, as visible to a user.

Also, if display of plural images is requested by a single source of request, CPU 11*a* of image-forming device 1 carries out an operation to display a screen in which the images are arranged in a stack order specified by the source of request. For example, if display of windows WX1 and WX2 is requested by application A assigned to a normal layer, and display of window WY1 is requested by application A assigned to a low layer, while there is no request to display a window from application A assigned to an urgent layer or a high layer, a screen shown in FIG. 12 is displayed. The figure is a drawing of a screen as viewed by a user. In the drawing, an urgent layer and a high layer are not shown, and only normal layer L3 and low layer L4 are shown. In this case, windows WX1 and WX2 arranged in normal layer L3 are positioned before window WY1 arranged in low layer L4, in the visual direction; accordingly, only windows WX1 and WX2 are visible to a user. Also, windows WX1 and WX2 are arranged in normal layer L3 in a stack order specified by application A that has requested display of the windows. Namely, in each display layer, a display control is performed on the basis of a priority specified to windows by a source of request, and, between display layers, a display control is performed on the basis of a priority assigned to an entity that requests display of an image.

[Modifications]

The above exemplary embodiment may be modified as described below. It is to be noted that the following modifications may be combined with each other.

(Modification 1)

In the above exemplary embodiment, when a window is hidden, the window may be deleted or minimized to an icon.

Also, in the above exemplary embodiment, where each window is displayed over the entire screen, the size of a window may be modified. For example, in the screen shown in FIG. 7, windows WD1 and WD2 may be configured to be half size, and arranged so that they do not overlap each other. Alternatively, windows may be configured to be slightly smaller than the entire screen, and displayed at slightly different positions. Alternatively, a window arranged at the forefront of a screen may be configured to have a semi-transparent end so that other windows behind the window can be seen through the end.

(Modification 2)

In the above exemplary embodiment, non-display control data 31 may be updated by a user. For example, data indicating that a non-display control is necessary associated with a display priority "HIGH" may be updated to data indicating that a non-display control is not necessary.

Also, in the above exemplary embodiment, it is possible not to perform a non-display control. In this case, if a preceding window group exists, a subject window may be arranged before a window belonging to the preceding window group, in the visual direction.

(Modification 3)

In the above exemplary embodiment, where when a display priority is not specified, it is set to "NORMAL", a display priority may be set to another level. For example, a display priority may be set to "LOW". The point is that if a display priority of a window group to which a subject matter belongs is not obtained, a display priority for the window group is set.

(Modification 4)

In the above exemplary embodiment, where a display priority and a group ID are specified by application A, these pieces of data may be specified by window manager M. In this case, storage unit 13 may be configured to store a table shown in FIG. 6, and if display of a window is requested by application A, CPU 11a may specify a display priority and a group ID with regard to application A on the basis of the table, using window manager M.

(Modification 5)

In the above exemplary embodiment, where a group ID is specified for each application A, an identical group ID may be specified for plural applications A. Alternatively, plural group IDs may be specified for a single application A.

(Modification 6)

In the above exemplary embodiment, where after a request to display a window is made by application A, data on a display priority associated with the application is obtained, the data may be obtained before the request to display a window is made. In this case, in the operation shown in FIG. 8, steps S11 and S12 for obtaining data on a display priority are skipped, and step S13 is carried out before steps S11 and S12 are carried out. At step S13, only a group ID is obtained. At step S16, if it is determined that the obtained group ID is a group ID of a managed window group, data on a display priority already obtained as data indicative of a display priority of application A that has requested display of a window is used in the subsequent process.

(Modification 7)

Figure 13:
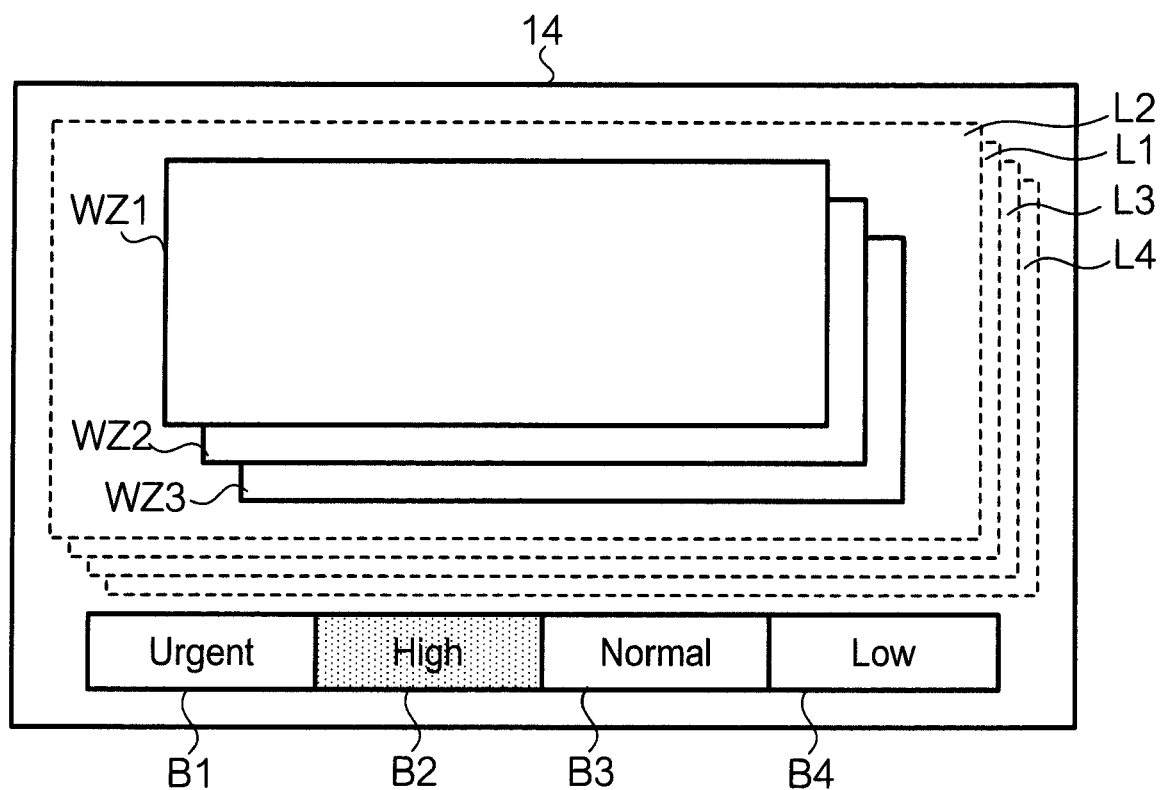
FIG. 13 is a diagram illustrating an example of a screen on which select buttons according to a modification are provided.

In the above exemplary embodiment, a select button for selecting a display layer may be provided on a screen displayed on display operation unit 14. FIG. 13 is a diagram illustrating an example of a screen with select buttons. For example, if display operation unit 14 is operated by a user to press select button B2 for selecting high layer L2, windows WZ1 to WZ3 arranged in high layer L2 are arranged at the forefront of the screen. A stack order of windows WZ1 to WZ3 in high layer L2 is determined in accordance with an instruction from application A that has requested display of the windows. FIG. 13 shows an example where it has been instructed by application A3 that windows WZ1 to WZ3 are arranged in a stack order: window WZ1, window WZ2, and window WZ3 from a near side to a far side in the visual direction. According to the present modification, a user is able to select a display layer to be arranged at the forefront of a screen, thereby making an image arranged in the display layer visible.

(Modification 8)

In the above exemplary embodiment, a window for receiving an instruction to form an image may be displayed on display operation unit 14. If such a window is displayed, and an instruction to form an image is received, image-forming unit 16 may form an image in accordance with the instruction.

The present invention may be embodied not as an image-forming device but as another device such as a computer or a mobile phone.

(Modification 9)

In the above exemplary embodiment, the operation of image-forming device 1 may be performed using a single hardware resource or may be performed using plural hardware resources cooperating with each other. Also, the operation of CPU 11a may be performed by a single program or may be performed by a combination of plural programs. Also, one or more programs executed by CPU 11a may be distributed via a computer-readable recording medium including a magnetic recording medium such as a magnetic tape or a magnetic disk, an optical recording medium such as an optical disk, a magneto-optical recording medium, and a semiconductor memory. Also, the programs may be downloaded via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control device comprising:
   a storage unit that stores data on a display priority for each application;
   a request receiving unit that receives from an application a request to display a first image, in which a stack order of images in a visual direction of a user is specified;
   an obtaining unit that obtains data on a display priority specified among the display priorities stored in the storage unit, wherein the display priority corresponds to the application which has made the request;
   a display layer identifying unit that identifies a display layer corresponding to the display priority indicated by the obtained data from among a plurality of display layers divided from a near side to a far side in the visual direction, wherein the display layer at the near side is associated with a higher display priority than the display layer at the far side; and
   a display control unit that causes a display unit to display a screen in which the first image and a second image belonging to an image group identical to the image group to which the first image belongs, the second image being an image, display of which is instructed by the application which has made the request, are arranged in the identified display layer, the first image and the second image being arranged from the near side to the far side in the visual direction in the stack order specified by the application.

2. The display control device according to claim 1, wherein if a third image belonging to an image group different from the image group to which the first image belongs has been arranged in the identified display layer, the first image is arranged in priority to the third image.

3. The display control device according to claim 2, wherein in the screen the first image is arranged before the third image.

4. The display control device according to claim 2, wherein in the screen the third image is hidden.

5. The display control device according to claim 1, further comprising a setting unit that, if the data on the display priority corresponding to the application which has made the request is not obtained by the obtaining unit, sets a display priority to the image group to which the first image belongs, wherein the display layer identifying unit identifies the display layer on the basis of the set display priority instead of the display priority indicated by the obtained data.

6. The display control device according to claim 1, wherein if there is a third image belonging to an image group identical to the image group to which the first image belongs, and the request receiving means further receives a request to hide the third image, the third image is arranged in the identified display layer in the stack order specified by the application.

7. A display control method comprising:
   receiving from an application a request to display a first image, in which a stack order of images in a visual direction of a user is specified;
   obtaining data on a display priority specified among the display priorities stored in a storage unit that stores data on a display priority for each application, wherein the display priority corresponds to the application which has made the request;
   identifying a display layer corresponding to the display priority indicated by the obtained data from among a plurality of display layers divided from a near side to a far side in the visual direction, wherein the display layer at the near side is associated with a higher display priority than the display layer at the first side; and
   causing a display unit to display a screen in which the first image and a second image belonging to an image group identical to the image group to which the first image belongs, the second image being an image, display of which is instructed by the application which has made the request, are arranged in the identified display layer, the first image and the second image being arranged from the near side to the far side in the visual direction in the stack order specified by the application.

8. A non-transitory computer readable medium storing a program causing a computer to execute a process for display control, the process comprising:
   receiving from an application a request to display a first image, in which a stack order of images in a visual direction of a user is specified;
   obtaining data on a display priority specified among the display priorities stored in a storage unit that stores data on a display priority for each application, wherein the display priority corresponds to the application which has made the request;
   identifying a display layer corresponding to the display priority indicated by the obtained data from among a plurality of display layers divided from a near side to a far side in the visual direction, wherein the display layer at the near side is associated with a higher display priority than the display layer at the far side; and
   causing a display unit to display a screen in which the first image and a second image belonging to an image group identical to the image group to which the first image belongs, the second image being an image, display of which is instructed by the application which has made the request, are arranged in the identified display layer, the first image and the second image being arranged from the near side to the far side in the visual direction in the stack order specified by the application.

* * * * *